United States Patent [19]

Bracha

[11] Patent Number: 4,654,567
[45] Date of Patent: Mar. 31, 1987

[54] BLOCKING PROTECTION ARRANGEMENT FOR ELECTRONICALLY COMMUTATED DC MOTORS

[75] Inventor: Franz Bracha, Landshut, Fed. Rep. of Germany

[73] Assignee: Standard Elektrik Lorenz Aktiengesellschaft, Stuttgart, Fed. Rep. of Germany

[21] Appl. No.: 710,636

[22] Filed: Mar. 11, 1985

[51] Int. Cl.⁴ .............................................. H02P 6/02
[52] U.S. Cl. .................................. 318/254; 318/138; 318/439; 361/23
[58] Field of Search ............... 318/138, 254, 331, 439, 318/434; 361/23, 30

[56] References Cited

U.S. PATENT DOCUMENTS

| | | | |
|---|---|---|---|
| 3,864,610 | 2/1975 | Kawamoto et al. | 318/254 A X |
| 3,887,844 | 6/1975 | Yoshida | 318/254 A X |
| 3,916,272 | 10/1975 | Grunleitner et al. | 318/254 A X |
| 4,030,005 | 6/1977 | Doemen | 318/138 |
| 4,070,606 | 1/1978 | Morozumi et al. | 318/254 A |
| 4,435,673 | 3/1984 | Hagino et al. | 318/254 |
| 4,473,782 | 9/1984 | Reinhardt et al. | 318/254 |

OTHER PUBLICATIONS

"Hall Effect Devices and Their Applications", Electronics Industry, May 1979, pp. 23–27.

Primary Examiner—William M. Shoop, Jr.
Assistant Examiner—Bentsu Ro
Attorney, Agent, or Firm—T. L. Peterson; J. S. Christopher

[57] ABSTRACT

The blocking protection arrangement includes a first transistor whose emitter-collector path lies in the base voltage supply of second and third switching transistors performing commutation. The first transistor receives its base voltage from a self-induction voltage of a stator winding. In the event of a blocking of a motor, this voltage is missing, so that the first transistor is rendered nonconductive.

5 Claims, 2 Drawing Figures

BLOCKING PROTECTION ARRANGEMENT FOR ELECTRONICALLY COMMUTATED DC MOTORS

BACKGROUND OF THE INVENTION

The invention relates to an arrangement for electronically commutating a brushless DC motor, and more particularly to the stator current switching effected via switching transistors controlled by rotor position sensors.

PRIOR ART STATEMENT

Commutation arrangements are known (German Published Patent Application DE-OS No. 32 03 691). The conventional arrangement comprises two rotor winding strings which, via a switch, are alternatingly applied to a source of voltage, so as to permit a current to flow therein. The stator winding strings are connected in such a way that, for a rotation of the rotor from 0 to 180 degrees, one stator winding string is connected to the voltage source, whereas for the rotation of the rotor from 180 to 360 degrees, the other stator winding string is connected to the source of voltage. The arrangement described hereinbefore is referred to as a unipolar motor control.

There are also known arrangements which have either only one winding string or in which the two winding strings are connected in parallel and disposed in the diagonal branch of a bridge circuit. Transistors in this conventional arrangement are rendered conductive in such a way that, for a rotation of the rotor from 0 to 180°, current is permitted to flow through the winding string or the winding strings in the one direction. For a rotation from 180° to 360°, current is permitted to flow in the other direction. This conventional type of arrangement is referred to as a bipolar motor control.

In these arrangements it is necessary to take measures for protecting the switching transistors in the event of a motor blocking.

When an electronically commutated brushless DC motor is blocked, a high collector or stator direct current flows in the stator portion. This direct current is chiefly dependent upon the ohmic resistance of the stator winding lying in the collector branch of the switching transistor. It is also dependent upon the applied operating voltage. This direct current amounts to a multiple of the operating current for which both the motor and the electronic components are dimensioned. When this blocking happens to last longer, therefore, an electric and thermal overload is caused. This then often leads to the destruction of the switching transistors.

In the conventional arrangement the base electrodes of the collector-emitter paths lying in the base branch of the switching transistors are rendered conductive by control transistors.

The conventional arrangement is for many practical applications, too expensive.

SUMMARY OF THE INVENTION

According to the present invention, the emitter-collector path of a transistor is inserted into the base voltage supply of switching transistors. The base of the transistor, via a diode and, if so required, via a capacitor, is connected to a terminal common to the collector of a switching transistor and common to the associated stator winding.

BRIEF DESCRIPTION OF THE DRAWINGS

In the drawings, which are to be regarded as merely illustrative.

DESCRIPTION OF THE PREFERRED EMBODIMENTS

Figure 1:
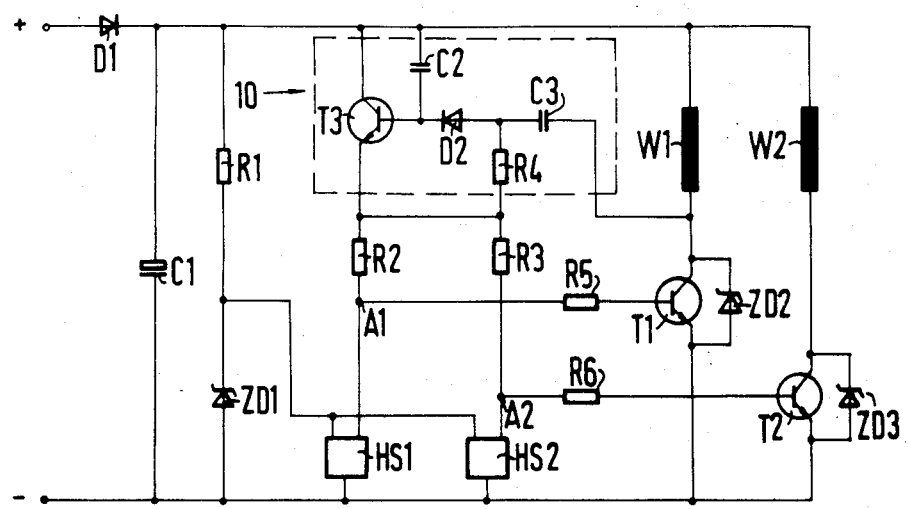
FIG. 1 is a schematic diagram of an electronic commutation circuit with a unipolar control.

In the circuit arrangement as shown in FIG. 1, the blocking protection includes a transistor T3, a resistor R4, capacitors C2, C3 and a diode D2 which are all shown within a dotted box 10.

During operation of the motor and in the conventional manner, switching transistors T1 and T2 are alternatingly rendered conductive during each half of rotor rotation. For alternate halves, rotor current is permitted to flow through the stator winding W1. The remainder of the time it flows in stator winding W2. Owing to on-off switching of the current, there is a change of the magnetic field in the stator windings W1 and W2. By this field variation a voltage is induced in the stator windings W1 and W2. This voltage is taken off at the stator winding W1 and is fed, via diode D2, as a positive base voltage to the transistor T3.

As long as the motor is running and, consequently, the induction voltage is being produced, the transistor T3 is rendered conductive. Switching transistors T1 and T2 can thus be rendered conductive in accordance with the rotor position. The switching transistors T1 and T2 are rendered conductive or nonconductive in the known way in dependence upon the rotor position. The latter is detected with the aid of Hall effect switches HS1 and HS2. In practice, these Hall effect switches HS1 and HS2 each act like a switching contact which must be imagined to be lying between the lower (−) and the righthand upper terminal (A1 or A2). Quite depending in what way the Hall effect switch is disposed in relation to a permanent magnet pole and on what polarity (north or south pole) the latter has, the switching contact is either closed or opened.

The control of the switching transistor T2 is briefly described in the following. Relative thereto, it is first assumed that, owing to the respective rotor position, the Hall effect switch HS2 is opened. In that case, the switching transistor T2 receives a positive base voltage via D1, T3, R3 and R6. Transistor T2 is thus rendered conductive. Following a variation of the rotor position between 0 and 180 angular degrees, there is effected the closing of the switching contact which is represented by the Hall effect switch HS2. On account of this, the base of T2 almost receives the same potential as the negative terminal of the source of voltage, so that the transistor T2 is driven into the nonconducting state.

If now the motor is blocked, no induction voltage is produced any longer in the stator winding W1. The positive base voltage at T3 is still maintained until the capacitor C3 has discharged. Accordingly, in the case of a short-lasting blockade, the motor could immediately re-start. The time duration until the final disconnection of the transistor T3 depends on the capacitance of the capacitor C3 and on the operating voltage.

If the motor remains blocked beyond this period of time, then the collector current of the switching transistor T1 drops to the value 0. At the end of the blocking period, the motor is again ready to be operated and can restart after one of the following measures have been taken:

by turning on the operating voltage anew;
by angular momentum (starting the rotor).

In so doing, the capacitor C2 is momentarily charged and keeps the base of the transistor T3 positive until it is discharged. The motor is permitted to re-start, and an alternating voltage appears at the collector of the transistor T1, so that in the way already described hereinbefore, the base of transistor T3 receives a positive voltage as long as the motor runs. Relative thereto, the size of the capacitor C3 also has an influence upon the starting behavior of the motor.

The circuit arrangement may also be modified as follows:

The positive base voltage required for switching the transistor T3 may also be derived from one or two galvanically separated secondary windings which, together with the motor coils (as primary windings) are wound onto the same coilforms. Instead of the half-wave rectification there may also be employed a full-wave rectification or a bridge circuit. Basically, for T3 instead of the npn transistor, it is also possible to use a pnp transistor. In such case, however, care would have to be taken of a corresponding polarity of the components.

Figure 2:
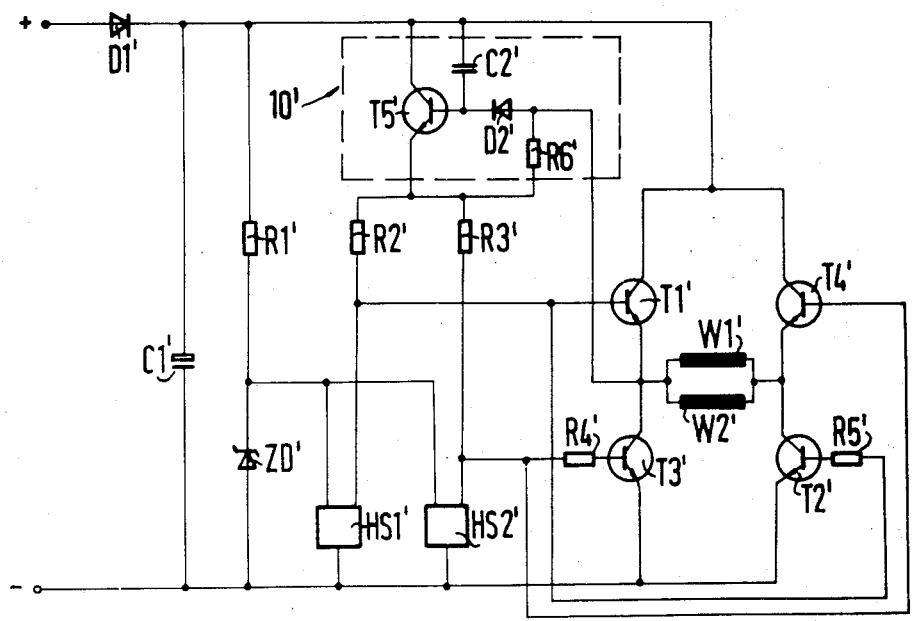
FIG. 2 is a schematic diagram of an electronic commutation circuit with a bipolar control.

In the circuit arrangement as shown in FIG. 2, the blocking protection operates in the same way as described hereinbefore in connection with FIG. 1. The circuit arrangement as shown in FIG. 2 relates to an electronic commutation circuit providing for a bipolar control of stator windings W1' and W2'. Depending upon the rotor position and, consequently, on the switching state of Hall effect switches HS1' and HS2', either switching transistors T1' and T2' or switching transistors T3' and T4' are conductive. A current thus flows through the parallel-connected stator windings W1' and W2' in one direction during half the stator rotation and, in the other direction during the next half of the stator rotation.

The blocking protection circuit as shown in FIG. 2 comprises no capacitor between the stator windings W1', W2' and diode D2' (C3 in FIG. 1). It has proved that this capacitor is not required in the circuit arrangement according to FIG. 2.

What is claimed is:

1. An arrangement for electronic commutation comprising:
    a motor;
    a permanent magnet rotor within said motor;
    stator windings cooperating with said rotor;
    said rotor being at least bi-polar magnetized;
    a plurality of rotor position sensors;
    first and second transistors for switching current in said stator windings on and off;
    a base voltage supply for said first and second transistors;
    said first and second transistors each having a base coupled to and controlled by said rotor position sensors;
    an electric blocking protection circuit comprising:
    a third transistor;
    means to supply a control voltage to said third transistor derived from said stator windings, said third transistor having an emitter-collector path inserted into said base voltage supply of said first and second transistors; and
    a diode, said third transistor having a base connected through said diode to a common terminal connected between a collector of one of said first and second transistors and a corresponding one of said stator windings.

2. An arrangement as claimed in claim 1, wherein:
    a capacitor is connected between said base of said third transistor and said common terminal.

3. An improvement in a brushless DC motor, including a permanent magnet rotor within said motor, stator windings cooperating with said rotor, said rotor being at least bipolar magnetized, a plurality of rotor position sensors, a first and a second transistors for selectively switching current in said stator windings on or off, a base voltage supply for said first and said second transistors, said first and said second transistors each having a base selectively controlled by said rotor position sensors, said improvement comprising:
    a third transistor;
    means for supplying a control voltage to said third transistor derived from said stator windings, said third transistor having an emitter-collector path serially connected within said base voltage supply of said first and said second transistors; and
    a diode, said third transistor having a base connected through said diode to a common terminal connected between a collector of one of said first and said second transistors and to a corresponding one of said stator windings.

4. The improvement of claim 3 further comprising a capacitor, said capacitor being connected between said base of said third transistor and said common terminal.

5. An improvement in a brushless DC motor for protecting said motor from circuit damage during motor jamming, said motor including at least two stator windings, switching means with a control input for selectively energizing and de-energizing said stator windings in response to a control voltage provided to said control input, said improvement comprising:
    means for selectively providing said control voltage to said switching means with which said switching means responsively and selectively energizes one of said stator windings and de-energizes another one of said stator windings, said means for providing said control voltage being disabled whenever any one of said stator windings ceases to be selectively energized and de-energized by said switching means, disablement of said means for providing said control voltage thus terminating coupling of said control voltage to said switching means;
    wherein said means for selectively providing said control voltage comprises:
    an RC network;
    a transistor;
    said transistor having an emitter-collector path serially coupled to said control input of said switching means, said transistor having a base coupled to said switching means and to at least a corresponding one of said stator windings through said RC network,
    whereby a steady current in said corresponding one of said stator windings allows said transistor to turn off and to disable said switching means thereby cutting off current to said stator windings.

* * * * *